(12) United States Patent
Imasaka et al.

(10) Patent No.: US 11,117,102 B2
(45) Date of Patent: Sep. 14, 2021

(54) CHA-TYPE TITANOSILICATE SEPARATION MEMBRANE AND PRODUCTION METHOD THEREFOR AND GAS SEPARATION METHOD

(71) Applicants: HITACHI ZOSEN CORPORATION, Osaka (JP); THE SCHOOL CORPORATION KANSAI UNIVERSITY, Osaka (JP)

(72) Inventors: Satoshi Imasaka, Osaka (JP); Sadao Araki, Osaka (JP); Hideki Yamamoto, Osaka (JP); Hiroyasu Ishii, Osaka (JP)

(73) Assignees: Hitachi Zosen Corporation, Osaka (JP); The School Corporation Kansai University, Osaka (JP)

( * ) Notice: Subject to any disclaimer, the term of this patent is extended or adjusted under 35 U.S.C. 154(b) by 267 days.

(21) Appl. No.: 16/294,336

(22) Filed: Mar. 6, 2019

(65) Prior Publication Data

US 2019/0275474 A1   Sep. 12, 2019

(30) Foreign Application Priority Data

Mar. 7, 2018   (JP) .............................. JP2018-040807

(51) Int. Cl.
   *B01D 71/02*   (2006.01)
   *C01B 39/08*   (2006.01)
   (Continued)

(52) U.S. Cl.
   CPC ......... *B01D 71/028* (2013.01); *B01D 53/228* (2013.01); *B01D 67/0051* (2013.01);
   (Continued)

(58) Field of Classification Search
   None
   See application file for complete search history.

(56) References Cited

U.S. PATENT DOCUMENTS

| 2003/0084786 A1* | 5/2003 | Chau ................. B01D 67/0051 95/45 |
| 2018/0072579 A1* | 3/2018 | Petrovic ................. C01B 39/04 |

(Continued)

FOREIGN PATENT DOCUMENTS

| JP | 2005-262064   | * | 9/2005 | ............. B01D 71/02 |
| JP | 2005-262064 A |   | 9/2005 | |
| WO | 2017/081841 A |   | 5/2017 | |

OTHER PUBLICATIONS

English language machine translation for JP 2005-262064. Provided by Applicants. (Year: 2019).*

(Continued)

*Primary Examiner* — Jason M Greene
(74) *Attorney, Agent, or Firm* — Pillsbury Winthrop Shaw Pittman, LLP (57) ABSTRACT

The present invention provides a titanosilicate separation membrane which can also be used for separating a mixed gas containing a molecule having a relatively small size, has high durability in a high temperature environment, and has a high permeation rate and a high selectivity for a mixed gas containing water vapor. A titanosilicate separation membrane has a CHA-type titanosilicate crystal structure formed on a porous support, wherein aluminum is not substantially contained in the backbone of the titanosilicate crystal structure, and the titanosilicate crystal structure is constituted by silicon, oxygen, and titanium.

3 Claims, 6 Drawing Sheets (51) Int. Cl.
    *C01B 39/04* (2006.01)
    *B01D 53/22* (2006.01)
    *B01D 67/00* (2006.01)
    *B01D 69/10* (2006.01)

(52) U.S. Cl.
    CPC ............ *C01B 39/04* (2013.01); *C01B 39/085* (2013.01); *B01D 69/10* (2013.01); *B01D 2325/02* (2013.01)

(56) References Cited

U.S. PATENT DOCUMENTS

2018/0326365 A1* 11/2018 Choi .................. B01D 67/0051
2018/0369746 A1* 12/2018 Hayashi ............... B01D 71/028

OTHER PUBLICATIONS

Yusuke Kunitake et al., "Synthesis of Ti-CHA by FAU Zeolite Conversion", Book of Abstracts, 30th Meeting of the Japan Association of Zeolite, Nov. 26, 2014, p. 18, w/English translation.

* cited by examiner

CHA-TYPE TITANOSILICATE SEPARATION MEMBRANE AND PRODUCTION METHOD THEREFOR AND GAS SEPARATION METHOD

BACKGROUND OF THE INVENTION

Field of the Invention

The present invention relates to a dense separation membrane for separating and purifying a mixed gas in the petrochemical field, and a production method therefor, and a gas separation method.

Background Art

A CHA-type zeolite is one of the zeolites attracting attention. A CHA-type structure has a three-dimensional pore structure, and the pore diameter is about 0.38 nm (nearly equal to the molecular size of methane), and has a large cage inside. This pore diameter 0.38 nm is suitable for separating water, carbon dioxide, etc. as compared with the pore diameter of the other zeolite crystals when separating a specific component of a mixed gas from the mixed gas according to a molecular sieve action by using a difference between a zeolite pore diameter and a material molecular diameter.

A conventional CHA-type zeolite membrane contains aluminum in its backbone, and therefore has a disadvantage that the crystal structure is destroyed by an acid or water vapor, and the application range of the applicable mixed gas to be separated is limited.

Further, although water coexists in a gas separation system for purification of natural gas or the like, an aluminum atom causes adsorption of water in a zeolite pore, and therefore, a desired separation target becomes difficult to come out from the pore, and thus, it has a disadvantage that a desired processing amount cannot be obtained.

Further, the gas separation system is a severe separation system, in which the temperature and pressure are high and also hydrogen sulfide coexists, and the zeolite is required to have durability. At present, in order to improve the physicochemical characteristics of the zeolite, a high-silica zeolite membrane in which the Si/Al ratio is increased, and a crystalline pure silica membrane completely constituted only by silica described in Patent Document 1 (WO 2017/081841) have been proposed.

Further, a zeolite having high crystallinity in which part of the Al atoms is replaced with Ti atoms such as Ti-CHA described in Non-Patent Document 1 (Yusuke Kunitake, and others 5, "Synthesis of Ti-CHA Zeolite by Conversion of FAU Zeolite", Book of abstracts, 30th Meeting of the Japan Association of Zeolite, issued on Nov. 26, 2014), and a titanosilicate-type zeolite membrane in which all the Al atoms are replaced with Ti atoms described in Patent Document 2 (JP-A-2005-262064) have been proposed.

Even the crystalline pure silica membrane completely constituted only by silica described in Patent Document 1 has a disadvantage that the membrane is destroyed when it is exposed to high temperature, and has a problem in heat resistance.

In the zeolite in which part of the Al atoms in the crystal structure of the CHA-type zeolite is replaced with Ti atoms described in Non-patent Document 1, an improvement can be seen in durability and water adsorptivity as compared with conventional CHA-type zeolites, however, an Al atom still exists in the crystal structure, and therefore, the crystal is destroyed starting from this Al atom, or adsorbs water that inhibits the permeation performance.

In the titanosilicate-type zeolite membrane described in Patent Document 2, all the Al atoms in the crystal structure are replaced with Ti atoms, however, the zeolite crystal structure is an MFI type and has a larger pore diameter than a pore diameter of a CHA-type zeolite. The pore diameter of an MFI-type zeolite is from 0.5 to 0.55 nm, and therefore, the MFI-type zeolite cannot be used as a separation membrane for separating carbon dioxide, water, or the like from a mixed gas containing methane, ethane, or the like.

SUMMARY OF THE INVENTION

An object of the present invention is to provide a titanosilicate separation membrane, which can also be used for separating a mixed gas containing a molecule having a relatively small size that cannot be separated with an MFI-type zeolite separation membrane, has high durability in a high temperature environment, and adsorbs little water in separation of a mixed gas containing water, a production method for the titanosilicate separation membrane, and a separation method using the titanosilicate separation membrane.

Solution to Problem

The present invention (1) is directed to a titanosilicate separation membrane having a CHA-type titanosilicate crystal structure formed on a porous support, wherein aluminum is not substantially contained in the backbone of the titanosilicate crystal structure, and the titanosilicate crystal structure is constituted by silicon, oxygen, and titanium.

The clause "aluminum is not substantially contained" means that Al is not contained as a raw material. Therefore, even if impurity elements containing Al are inevitably incorporated from a heat-resistant container or the like at the time of, for example, hydrothermal synthesis in the production process, the material in which the impurities are incorporated is treated as a material which does not substantially contain impurities.

Since Ti is a tetravalent element in the same manner as Si, a synthesized titanosilicate theoretically does not have polarity, and the binding energy of Ti to oxygen (O) is very high, and therefore, by replacing Al in the zeolite crystal structure with Ti, the durability such as heat resistance is improved, and water is hardly adsorbed so as to improve the separation performance.

Incidentally, the "CHA" is a code for sorting zeolites according to the structure specified by the International Zeolite Association (IZA).

The present invention (2) is directed to a raw material for producing the titanosilicate separation membrane of the present invention (1), wherein the raw material contains at least a silicon source, a titanium source, water, and a fluoride as a mineralizer, and contains N,N,N-trialkyl-1-adamantaneammonium cations as a structure directing agent.

An ordinary CHA-type zeolite containing Al is obtained by performing a hydrothermal synthesis treatment in an alkaline gel containing NaOH or the like as a mineralizer. However, when an alkaline compound such as NaOH is used as a mineralizer for synthesizing a CHA-type zeolite which does not contain Al is used, there is a problem that the zeolite is not crystallized (solidified) even if hydrothermal synthesis is performed. In order to solve this problem, in the present invention, a fluoride is used in place of NaOH.

In order to produce a CHA-type titanosilicate which does not contain Al, a fluoride such as hydrofluoric acid, sodium fluoride, or calcium fluoride as a mineralizer, and a structure directing agent which plays a role like a template are needed. In the present invention, by using N,N,N-trialkyl-1-adamantaneammonium cations derived from 1-adamantanamine as the structure directing agent, a CHA-type titanosilicate which does not contain Al was successfully synthesized. It may be a hydroxide or a halide as long as it is a structure directing agent containing N,N,N-trialkyl-1-adamantaneammonium cations, however, in order to forma dense CHA-type titanosilicate crystal structure, it is preferred to use a hydroxide.

The main component of the raw material includes a silicon source, a titanium source, and water, and therefore, the CHA-type titanosilicate crystal structure to be synthesized does not substantially contain an Al atom in the crystal backbone. In this raw material, as other components, a fluoride as the mineralizer and N,N,N-trialkyl-1-adamantaneammonium cations as the structure directing agent are contained, and therefore, replacement of all the Al atoms in the crystal backbone with Ti atoms which has not been able to be realized for a longtime could be realized for the first time.

The present invention (3) is directed to a method for producing a titanosilicate separation membrane having a CHA-type titanosilicate crystal structure formed on a porous support, including a step of producing a seed crystal, a step of carrying the seed crystal on the porous support, and a step of applying a synthetic gel obtained by mixing a raw material containing a silicon source, a titanium source, a fluoride, N,N,N-trialkyl-1-adamantaneammonium cations, and water to the porous support having the seed crystal carried thereon, and performing hydrothermal synthesis.

By using this production method, it became possible to achieve replacement of all the Al atoms with Ti atoms, which has not been able to be achieved for a long time in the synthesis of a CHA-type titanosilicate membrane. The reason why a CHA-type titanosilicate membrane in which all the Al atoms are replaced with Ti atoms could not be synthesized by the method described in Patent Document 2 is that the selection of the mineralizer and the selection of the structure directing agent are different from those of the invention of this application.

The present invention (4) is directed to a gas separation method for separating a gas of a specific component from a mixed gas by using a titanosilicate separation membrane having a CHA-type titanosilicate crystal structure of the present invention (1) formed on a porous support, and bringing the mixed gas into contact with the titanosilicate separation membrane, wherein the mixed gas contains one type or two or more types of first gases having a molecular diameter not smaller than the pore diameter of the CHA-type titanosilicate crystal and one type or two or more types of second gases having a molecular diameter smaller than the pore diameter of the CHA-type titanosilicate crystal, and one type or two or more types of gases selected from the second gases are separated by allowing the gasses to permeate through the titanosilicate separation membrane and the porous support.

In the mixed gas, gas molecules having various molecular diameters are contained. The titanosilicate separation membrane of the present invention (1) has a CHA-type titanosilicate crystal structure, and therefore, a gas of a specific component can be separated from the mixed gas containing a molecule having a relatively small size which cannot be separated with an MFI-type zeolite separation membrane by the action of a molecular sieve.

The present invention (5) is directed to the gas separation method according to the present invention (4), wherein the first gas is one or more types of gasses selected from the group consisting of methane, ethane, acetic acid, ethanol, 2-propanol, sulfur hexafluoride, benzene, o-xylene, m-xylene, p-xylene, and toluene, and the second gas is one or more types of gasses selected from the group consisting of hydrogen, helium, water, methanol, carbon dioxide, argon, oxygen, and nitrogen.

The pore diameter of the CHA-type titanosilicate crystal structure of the present invention (1) is 0.38 nm. The gases which cannot permeate through this CHA-type titanosilicate crystal structure and the molecular diameters thereof (shown in parentheses) are methane (0.38 nm), ethane (0.44 nm), acetic acid (0.43 nm), ethanol (0.43 nm), 2-propanol (0.47 nm), sulfur hexafluoride (0.55 nm), benzene (0.66 nm), p-xylene (0.66×0.38 nm), and o-xylene and m-xylene (0.73×0.39 nm). The gases which can permeate through this CHA-type titanosilicate crystal structure and the molecular diameters thereof (shown in parentheses) are hydrogen (0.29 nm), helium (0.26 nm), water (0.30 nm), carbon dioxide (0.33 nm), argon (0.34 nm), oxygen (0.346 nm), methanol (0.36 nm), and nitrogen (0.364 nm).

Advantageous Effect of Invention

According to the present invention, a titanosilicate separation membrane, which can also be used for separating a mixed gas containing a molecule having a relatively small size that cannot be separated with an MFI-type zeolite separation membrane, has high durability in a high temperature environment, and adsorbs little water in separation of a mixed gas containing water, a production method for the titanosilicate separation membrane, and a separation method using the titanosilicate separation membrane can be provided.

DESCRIPTION OF THE PREFERRED EMBODIMENTS

Next, embodiments of the present invention will be described along with Example, however, the present invention is not limited thereto.

The porous support is not particularly limited, but is preferably a support made of an alumina ceramic. A step of producing a titanosilicate separation membrane according to the present invention can be divided into two steps: a step of preparing a seed crystal and a step of synthesizing a CHA-type titanosilicate crystal structure. In the step of preparing a seed crystal and also in the step of synthesizing a CHA-type titanosilicate crystal structure, a raw material contains at least a silicon source, a titanium source, water, and a fluoride as a mineralizer, and contains N,N,N-trialkyl-1-adamantaneammonium cations as a structure directing agent.

<Step of Preparing Seed Crystal>

Colloidal silica as the silicon source, $TiO_2$ as the titanium source, N,N,N-trialkyl-1-adamantaneammoniumcations as the structure directing agent, and a fluoride such as hydrofluoric acid, sodium fluoride, or calcium fluoride as the mineralizer are used. $TiO_2$ is preferably anatase type. As the structure directing agent containing N,N,N-trialkyl-1-adamantaneammonium cations, a hydroxide is preferred, and in Example, N,N,N-trimethyl-1-adamant ammonium hydroxide (TMAdaOH) was used.

Colloidal silica (40 wt %), $TiO_2$ (anatase type), and TMAdaOH (25 wt %, manufactured by SACHEM, Inc.) were mixed, and HF (46 wt %) was added thereto so that the mixed solution became neutral. Thereafter, the mixed solution was heated to 200° C. and stirred at 250 rpm, whereby $H_2O$ was evaporated. The resulting product was crushed with an agate mortar, and $H_2O$ was added thereto, whereby a synthetic gel was prepared. The molar ratio of the gel is as follows: $SiO_2$:$TiO_2$:TMAdaOH:HF:$H_2O$=1:x:1.4:1.4:6.0 (In Example, x was determined so that Si/Ti was 15, 30, and 57). The prepared gel was transferred to an autoclave, and a hydrothermal treatment was performed at 150° C. for 24 hours using an oven. The autoclave was taken out from the oven and cooled, and then, the resulting product was recovered by filtration. The product was washed with ion exchanged water and dried under reduced pressure for 24 hours. Finally, the product was fired at 700° C. for 10 hours in a firing furnace, whereby CHA-type titanosilicate particles were obtained.

<Step of Synthesizing CHA-Type Titanosilicate Crystal Structure>

Subsequently, the seed crystal is carried on the above-mentioned porous support. The carrying method is not particularly limited, but is preferably a rubbing method. A raw material containing the silicon source, the titanium source, the fluoride, N,N,N-trialkyl-1-adamantaneammonium cations, and water is mixed, whereby a synthetic gel is produced, and then, the gel is applied to the porous support having the seed crystal carried thereon, and hydrothermal synthesis is performed. The raw material of the synthetic gel is the same as the raw material used in the step of preparing the seed crystal. In Example, the synthesized CHA-type titanosilicate particles were used as the seed crystal, and carried on an alumina porous support (manufactured by Hitachi Zosen Corporation, outer diameter: 16 mm, inner diameter 12 mm) by a rubbing method. In the synthetic gel material, colloidal silica (40 wt %) as the silicon source, N,N,N-trimethyl-1-adamant ammonium hydroxide (TMAd-aOH) (25 wt %, manufactured by SACHEM, Inc.) as the structure directing agent, and $TiO_2$ (anatase type) as the titanium source were used. Colloidal silica, $TiO_2$, and TMAdaOH were mixed, and HF (46 wt %) was added thereto so that the mixed solution became neutral. Thereafter, the mixed solution was heated to 200° C. and stirred at 250 rpm, whereby $H_2O$ was evaporated. The resulting product was crushed with an agate mortar, and $H_2O$ was added thereto so as to obtain the following composition. The final molar composition of the synthetic gel to be prepared is as follows: $SiO_2$:$TiO_2$:TMAdaOH:HF:$H_2O$=1:x:1.4:1.4:6.0 (In Example, x was determined so that Si/Ti was 15, 30, and 57). The prepared synthetic gel was applied to the surface of the support after rubbing, and the entire face was sealed with a PTFE tape so that the synthetic gel did not flow down. The support having the synthetic gel applied thereto was transferred to an autoclave, and hydrothermal synthesis was performed at 150° C. for 72 hours. After the synthesis, the support was washed with water and dried under reduced pressure for 24 hours. Thereafter, the support was fired at 580° C. for 12 hours in a firing furnace.

Figure 1:
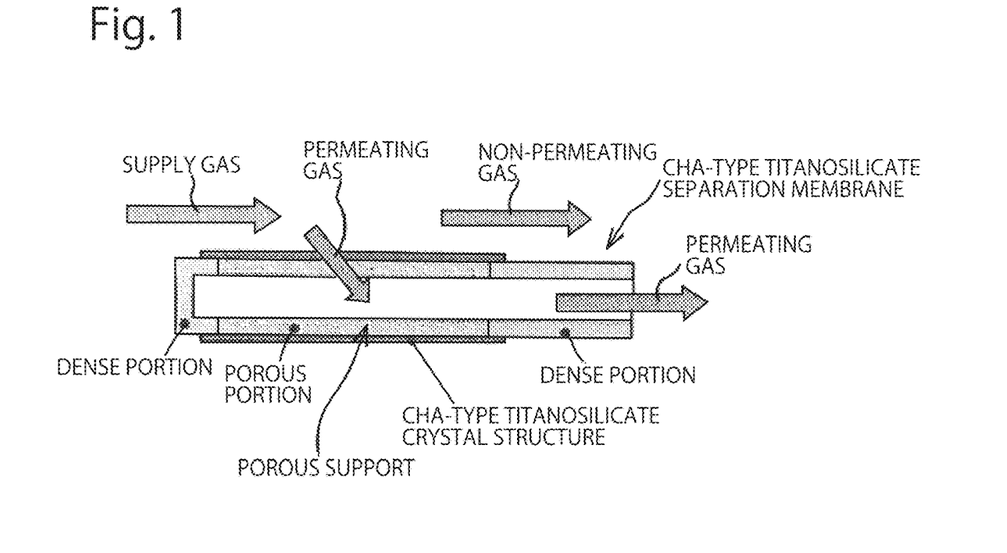
FIG. 1 shows a schematic view of gas separation with a titanosilicate separation membrane of the present invention.

FIG. 1 schematically shows a state where a gas is separated with the CHA-type titanosilicate separation membrane of the present invention. The porous support is composed of a porous portion, a cap-shaped dense portion, and a tube-shaped dense portion. On the surface of the porous portion, a CHA-type titanosilicate crystal structure is formed. A supply gas containing a gas to be separated is supplied from the left side, and a gas having a molecular diameter that allows permeation through the pore of the CHA-type titanosilicate crystal structure flows to the right inside the tube through the CHA-type titanosilicate crystal structure and the porous portion. A gas having a molecular diameter that does not allow permeation through the pore of the CHA-type titanosilicate crystal structure flows outside the tube, and therefore, the supply gas can be separated. By setting the pressure outside the tube higher than the pressure inside the tube, the permeating gas flows to the inside from the outside of the tube.

The porous support is not particularly limited, but is preferably an alumina support (manufactured by Hitachi Zosen Corporation). The porous support preferably has a diameter of 10 to 50 mm and a length of 500 to 1500 mm. The thickness of the CHA-type titanosilicate crystal structure is not particularly limited as long as the crystal structure can be formed thin, and the thickness thereof is preferably from about 1.0 to 10.0 μm.

Hereinafter, the CHA-type titanosilicate crystal structure which does not substantially contain Al and is composed of Si, Ti, and O according to the present invention is also abbreviated as "Ti-CHA", a conventional zeolite membrane containing Al is also abbreviated as "Al-CHA", and an all-silica (pure silica) zeolite membrane is also abbreviated as "All Silica" or "all-Si-CHA" in some cases.

Figure 2:
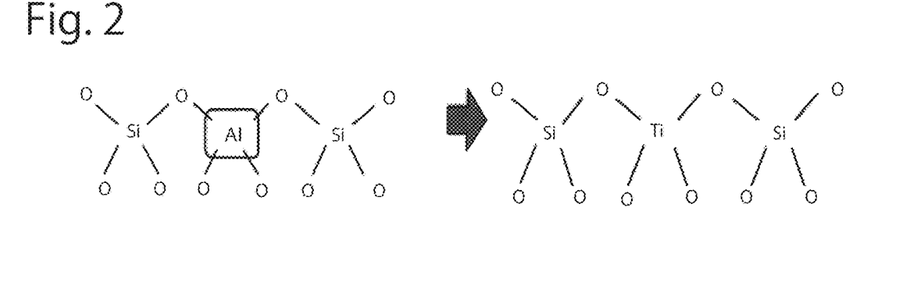
FIG. 2 is a view schematically showing a crystal structure of a conventional zeolite membrane containing an aluminum element and a CHA-type titanosilicate crystal structure in which an aluminum element is replaced with a titanium element of the present invention.

FIG. 2 schematically shows a zeolite crystal structure. The drawing on the left side of the arrow shows a conventional zeolite crystal structure containing an Al atom in the crystal structure, and the drawing on the right side of the arrow shows a CHA-type titanosilicate crystal structure of the present invention. The crystal structure does not substantially contain an Al atom and is constituted by Si, Ti, and O.

Figure 3:
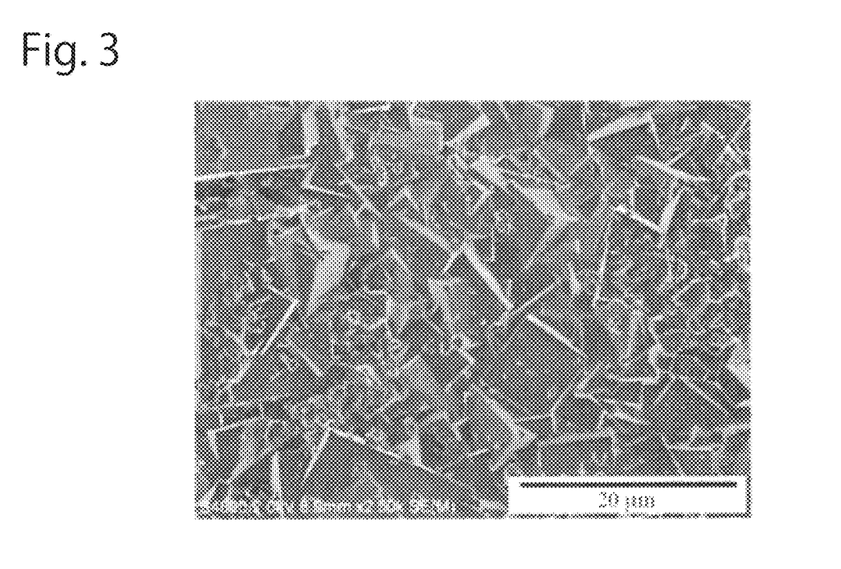
FIG. 3 is an electron micrograph of a surface of a titanosilicate separation membrane having a CHA-type titanosilicate crystal structure in which the Si/Ti ratio is 347 formed on an alumina support in Example.

FIG. 3 is a scanning electron microscopical image (SEM) of a surface of a titanosilicate separation membrane having a CHA-type titanosilicate crystal structure in which the Si/Ti ratio is 347 formed on an alumina support in Example. According to FIG. 3, it is found that crystals characteristic of a CHA-type titanosilicate are formed without gaps. The Si/Ti ratio of the raw material for synthesis to make the Si/Ti ratio of the CHA-type titanosilicate crystal structure after synthesis 347 was 30. Incidentally, the Si/Ti ratio of the raw material for synthesis to make the Si/Ti ratio of the CHA-type titanosilicate crystal structure after synthesis 45 was 15, and the Si/Ti ratio of the raw material for synthesis to make the Si/Ti ratio of the CHA-type titanosilicate crystal structure after synthesis 578 was 57.

Figure 4:
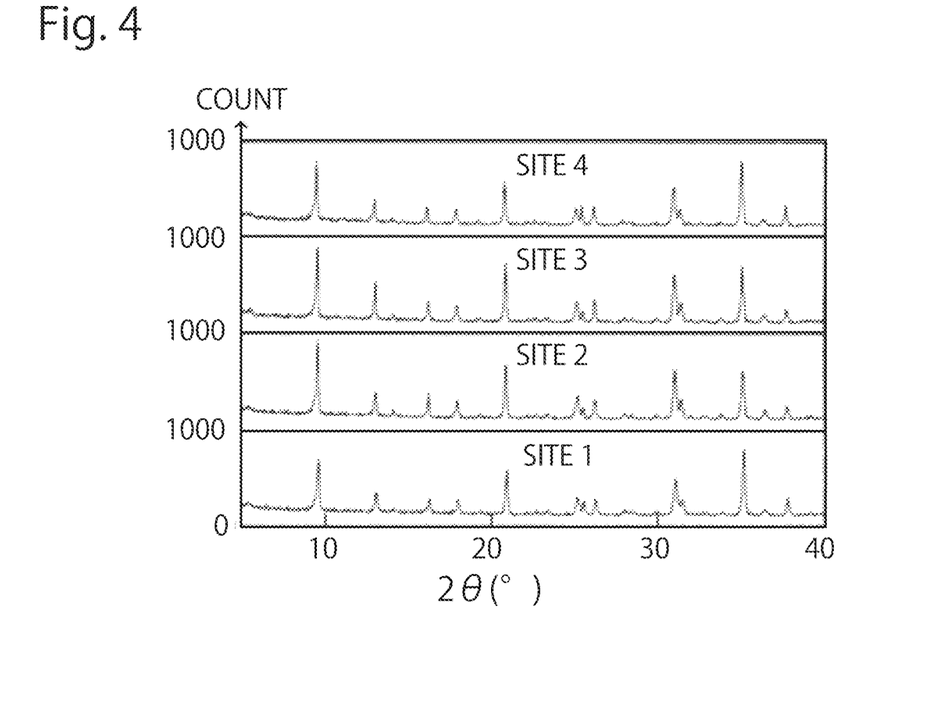
FIG. 4 shows X-ray diffraction patterns of a surface of the titanosilicate separation membrane having a CHA-type titanosilicate crystal structure in which the Si/Ti ratio is 347 formed on an alumina support in Example.

FIG. 4 shows X-ray diffraction patterns obtained at four sites (about 90° intervals) in the circumferential direction of a surface of the titanosilicate separation membrane having a CHA-type titanosilicate crystal structure in which the Si/Ti ratio is 347 formed on an alumina support in Example. According to these patterns, the synthesized CHA-type titanosilicate crystal structure could be identified as CHA type.

Figure 5:
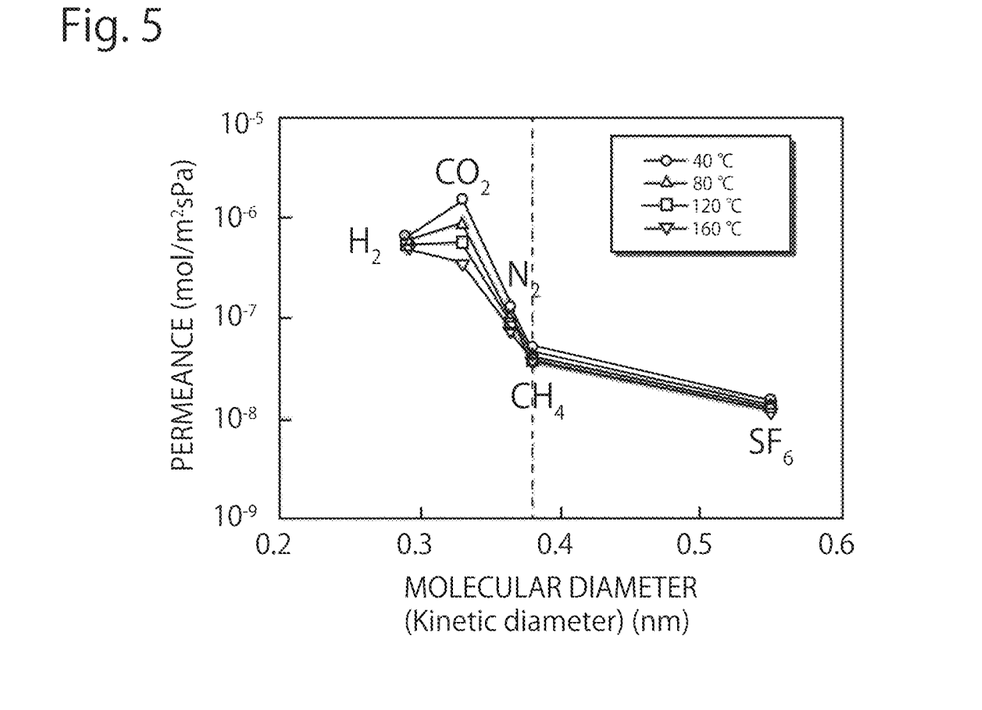
FIG. 5 shows the results of a permeance test for various gasses with respect to various temperatures of the titanosilicate separation membrane having a CHA-type titanosilicate crystal structure in which the Si/Ti ratio is 347 formed on an alumina support in Example.

FIG. 5 shows the results of a permeation rate test for various gasses with respect to various temperatures of the titanosilicate separation membrane having a CHA-type titanosilicate crystal structure in which the Si/Ti ratio is 347 formed on an alumina support in Example.

The gas permeation characteristics of the prepared titanosilicate separation membrane were evaluated using $H_2$ (0.29 nm), $CO_2$ (0.33 nm), $N_2$ (0.364 nm), $CH_4$ (0.38 nm), and $SF_6$ (0.55 nm). The inter-membrane differential pressure was set to 0.1 MPa, and the measurement temperature was set to 40, 80, 120, and 160° C. The permeation rate (mL/s) was measured using a bubble film flow meter. From the obtained results, the permeation rate $P_i$ [mol/m² sPa] of each gas and the selectivity $\alpha_{single}$ [-] were calculated using the following formulae (1) and (2), respectively.

$$P_i = q_i / S \Delta p_i \quad (1)$$

$$\alpha_{single} = P_x / P_y \quad (2)$$

Here, $P_i$, $q_i$, and $\Delta p_i$ denote the permeation rate (permeance) [mol/m² sPa], the permeation amount [mol/s], and the partial pressure difference [Pa] of an i component, respectively, and S denotes the membrane area [m²]. $P_x$ and $P_y$ denote the permeance [mol/m² sPa] of x component and the permeance [mol/m² sPa] of y component, respectively.

FIG. 5 shows the permeation rate of a single gas with respect to the measurement temperature of the titanosilicate separation membrane. When the measurement temperature was 40° C., the $CO_2$ permeation rate was $1.5 \times 10^{-6}$ molm⁻²s⁻¹ Pa⁻¹, and a very high value was obtained.

Next, the selectivity of each gas is shown in Table 1. A high value could be obtained for the selectivity of $H_2$ and $CO_2$ with respect to $CH_4$ having the same size as the pore diameter (0.38 nm) of the CHA-type titanosilicate crystal structure and $SF_6$ having a larger size than the pore diameter. This is considered to be due to a molecular sieve effect, and it was confirmed that a dense membrane can be synthesized.

TABLE 1

| | Selectivity of each molecule | | |
|---|---|---|---|
| Temperature (° C.) | $H_2/CH_4$ | $CO_2/CH_4$ | $H_2/SF_6$ |
| 40 | 16.3 | 37.7 | 43.3 |
| 80 | 15.5 | 23.1 | 44.6 |
| 120 | 14.7 | 14.8 | 43.6 |
| 160 | 13.9 | 13.9 | 42.9 |

Figure 6:
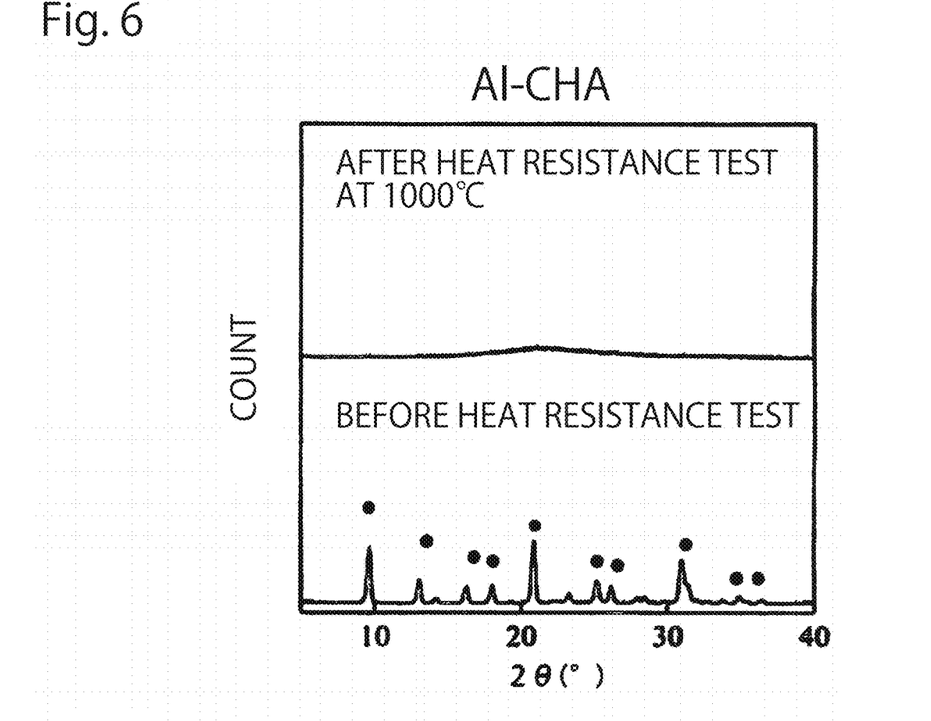
FIG. 6 shows X-ray diffraction patterns before and after a heat resistance test at 1000° C. of an Al-containing CHA-type (Al-CHA) zeolite.

FIG. 6 shows an X-ray diffraction pattern before a heat resistance test of the Al-CHA-type zeolite and an X-ray diffraction pattern after heat load at 1000° C. After the heat resistance test, the diffraction pattern characteristic of the CHA-type zeolite disappeared, and therefore, it is found that the zeolite containing Al in the backbone has low heat resistance. Incidentally, the Si/Al ratio of the Al-CHA-type zeolite subjected to this test is 10.

Figure 7:
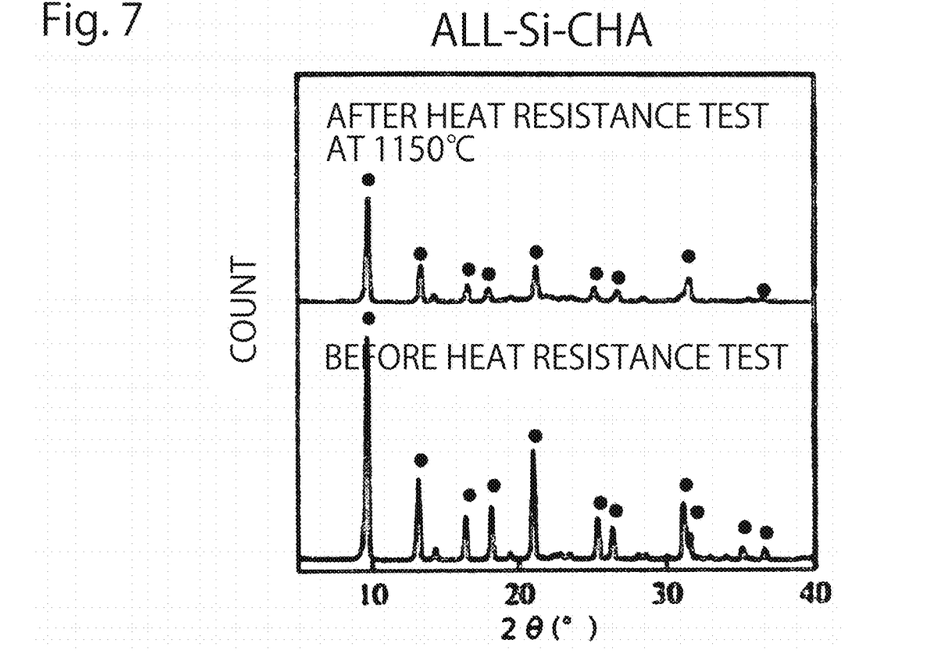
FIG. 7 shows X-ray diffraction patterns before and after a heat resistance test at 1150° C. of an all-silica CHA-type (all-Si-CHA) zeolite.

FIG. 7 shows an X-ray diffraction pattern before a heat resistance test of an all-Si-CHA-type zeolite and an X-ray diffraction pattern after heat load at 1150° C. After the heat resistance test, the diffraction pattern characteristic of the CHA-type zeolite remained, and therefore, it is found that the all-Si-CHA-type zeolite which does not contain Al in the backbone has high heat resistance.

Figure 8:
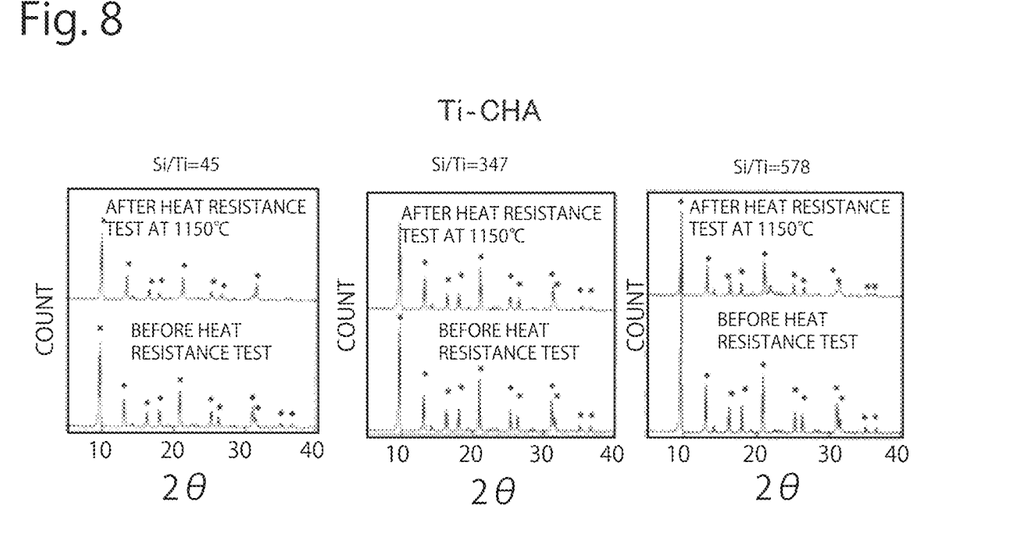
FIG. 8 shows X-ray diffraction patterns before and after a heat resistance test at 1150° C. when changing the Si/Ti ratio of the CHA-type titanosilicate according to the present invention.

FIG. 8 shows an X-ray diffraction pattern before a heat resistance test of the CHA-type titanosilicate and an X-ray diffraction pattern after heat load at 1150° C. After the heat resistance test, the diffraction pattern characteristic of the CHA-type titanosilicate remained, and therefore, it is found that the CHA-type titanosilicate in which the Al atoms are replaced with Ti atoms has high heat resistance in the same manner as the all-Si-CHA-type zeolite. Here, even when the Si/Ti ratio was changed to 45, 347, and 578, no change was observed in the heat resistance. As a result, it was found that the CHA-type titanosilicate in which the Al atoms are replaced with Ti atoms has high heat resistance without being affected by the Si/Ti ratio.

In the X-ray diffraction patterns in FIGS. 7 and 8, the comparison results of the peak height ratio at a 2 θ angle of around 21° after the heat resistance test with respect to before the heat resistance test are shown in the following Table 2.

TABLE 2

| | Zeolite type | Peak height ratio between before and after heat resistance test (%) |
|---|---|---|
| FIG. 7 | all-Si-CHA | 27 |
| left in FIG. 8 | Ti-CHA (Si/Ti = 45) | 60 |
| middle in FIG. 8 | Ti-CHA (Si/Ti = 347) | 79 |
| right in FIG. 8 | Ti-CHA (Si/Ti = 578) | 60 |

According to the results of Table 2, it is found that all the CHA-type titanosilicates according to the present invention shows even higher heat resistance performance than the all-Si-CHA-type zeolite.

Table 3 shows the measurement results of the BET specific surface area ($a_{sBET}$) and the micropore volume $V_{t\text{-}plot}$ before and after a heat resistance test for the Al-CHA-type zeolite, the all-Si-CHA-type zeolite, and the CHA-type titanosilicate. The conditions for the heat resistance test are the same as the conditions in the test whose results are shown in FIGS. 6 to 9. The measurement of the BET specific surface area was performed with a measuring device, BEL-SORP according to the BET method (Brunauer-Emmett-Teller method) manufactured by MicrotracBEL Corp. The measurement of the micropore volume was performed with a measuring device, BELSORP according to the t-plot method manufactured by MicrotracBEL Corp.

TABLE 3

|  | Al-CHA | | All-Si-CHA | | Ti-CHA (Si/Ti = 347) | |
| --- | --- | --- | --- | --- | --- | --- |
|  | Before test | After test | Before test | After test | Before test | After test |
| $a_{sBET}$ (m$^2$g$^{-1}$) | 776 | 238 | 714 | 462 | 813 | 819 |
| $V_{t\text{-}plot}$ (cm$^3$g$^{-1}$) | 0.277 | 4.58 × 10$^{-3}$ | 0.25 | 0.16 | 0.295 | 0.286 |

The ratio (%) of the value after the test to the value before the test obtained from the test results in Table 3 is shown in the following Table 4.

TABLE 4

|  | Al-CHA | All-Si-CHA | Ti-CHA (Si/Ti = 347) |
| --- | --- | --- | --- |
| $a_{sBET}$ after test/before test (%) | 30.3 | 64.7 | 100.7 |
| $V_{t\text{-}plot}$ (cm$^3$g$^{-1}$) after test/before test (%) | 1.65 | 64.0 | 96.9 |

According to the results of Table 4, a change between before and after the test is smaller and heat resistance is higher in the all-Si-CHA-type zeolite than in the Al-CHA-type zeolite. Further, the results show that a change between before and after the test is even smaller and heat resistance is even higher in the CHA-type titanosilicate than in the all-Si-CHA-type zeolite. Incidentally, the Si/Al ratio of the Al-CHA-type zeolite subjected to this test is 10.

Figure 9:
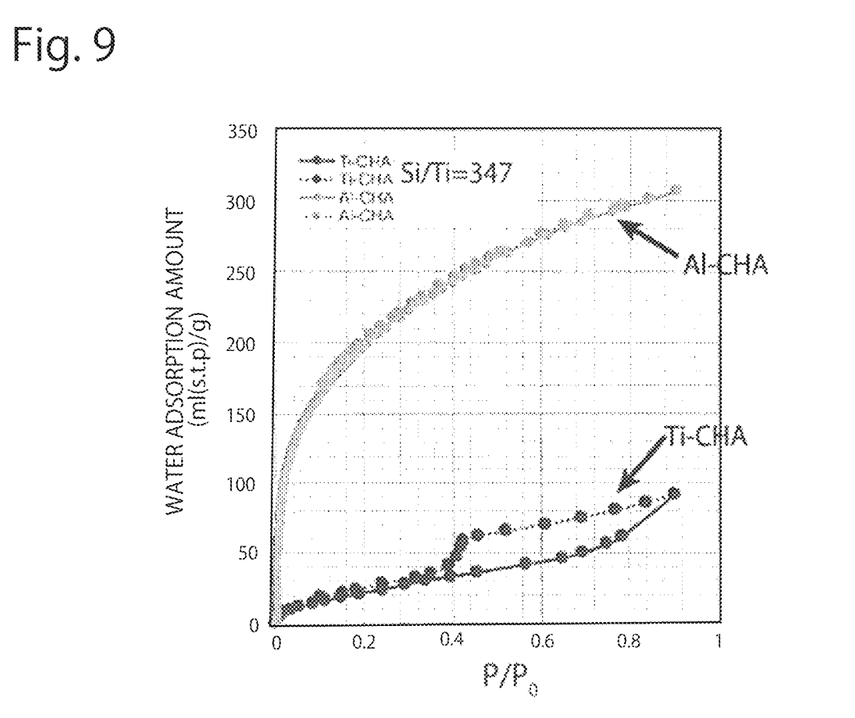
FIG. 9 shows comparison of the water vapor adsorption isotherms of an Al-containing CHA-type zeolite (Al-CHA) powder and a CHA-type titanosilicate powder according to the present invention.

FIG. 9 shows the water vapor adsorption isotherms of the Al-CHA-type zeolite and the CHA-type titanosilicate. Here, $P/P_0$ of the horizontal axis represents a relative pressure, and $P_0$ denotes a saturated water vapor pressure at 313 K. The vertical axis represents a water adsorption amount. The solid line is a curve during adsorption, and the dotted line is a curve during desorption. This measurement was performed with a measuring device, BELSORP-max according to the constant volume method manufactured by MicrotracBEL Corp.

It is found that as compared with the Al-CHA-type zeolite, the water adsorption amount of the CHA-type titanosilicate (Si/Ti ratio=347) is drastically reduced.

Figure 10:
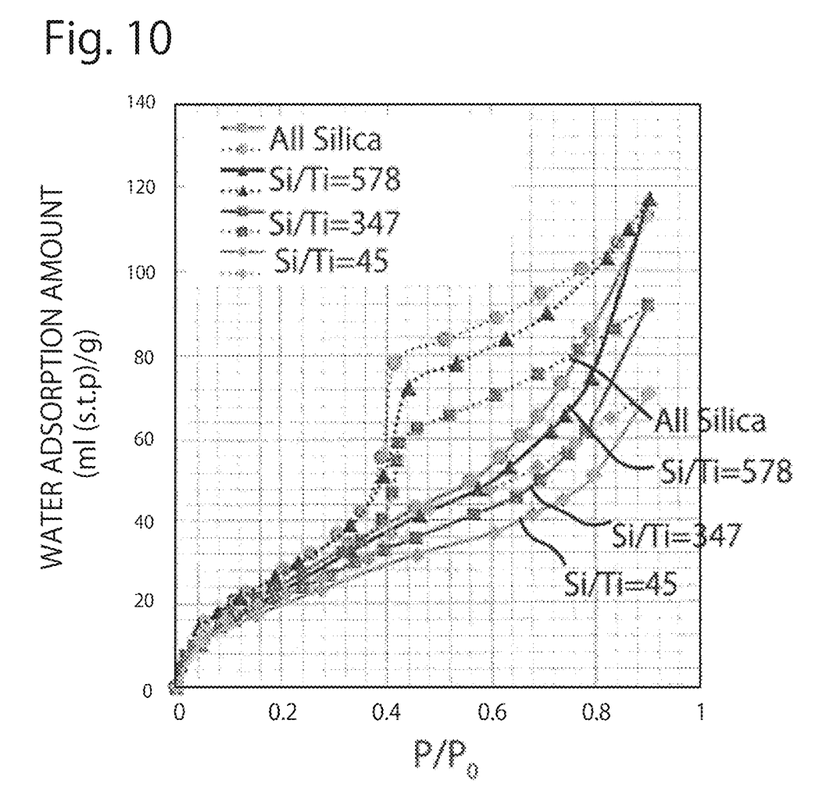
FIG. 10 shows comparison of the water vapor adsorption isotherms of an all-silica CHA-type (all-Si-CHA) zeolite powder and the CHA-type titanosilicate powder according to the present invention.

FIG. 10 shows the water vapor adsorption isotherms of the all-Si-CHA-type zeolite and the CHA-type titanosilicate (Si/Ti ratio=578, 347, 45). It is found that as compared with the all-Si-CHA-type zeolite, the water adsorption amount of the CHA-type titanosilicate is reduced. It is found that the reduction amount is increased as the Si/Ti ratio is decreased (as the amount of Ti component is increased), and a smaller Si/Ti ratio is preferred.

Figure 11:
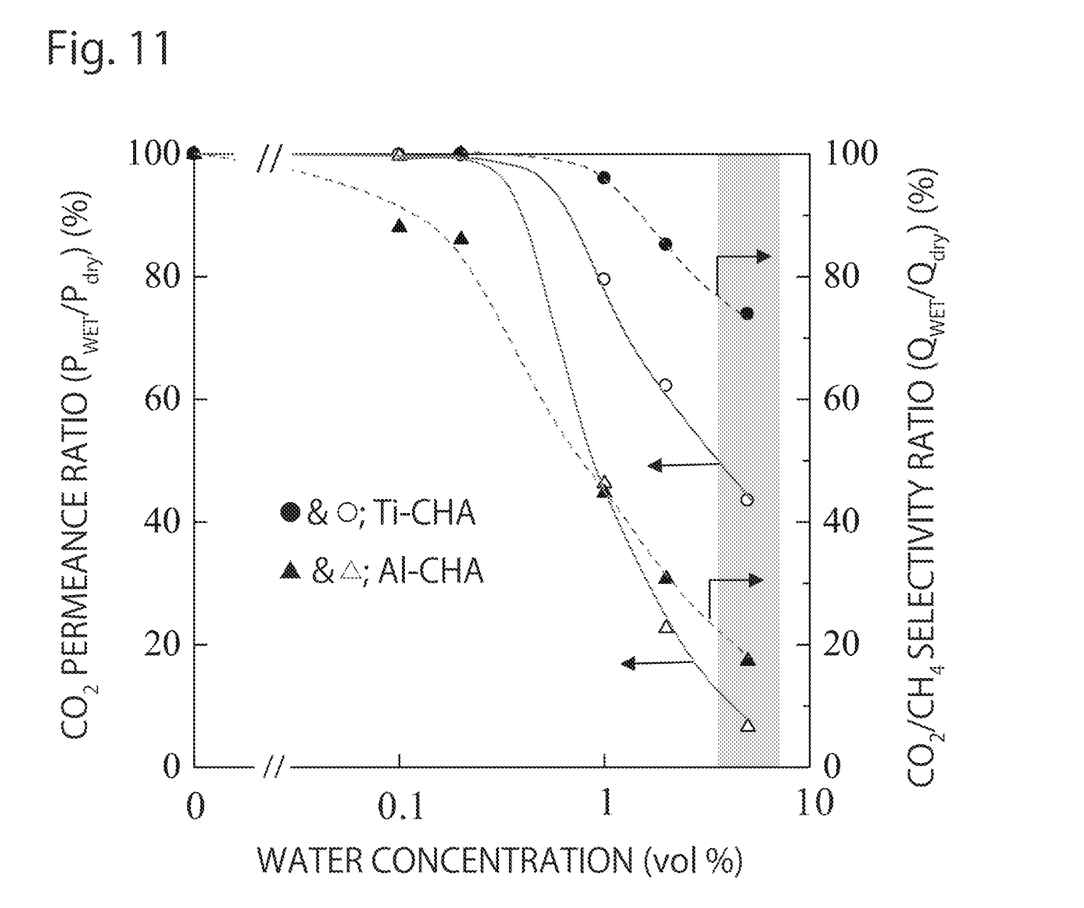
FIG. 11 shows the $CO_2$ permeance ratios and the $CO_2$/$CH_4$ selectivity ratios of an Al-CHA-type zeolite separation membrane and a CHA-type titanosilicate separation membrane according to the present invention.

FIG. 11 is a graph showing comparison of the effect of a water vapor content on the $CO_2$ permeance and the $CO_2/CH_4$ selectivity between the CHA-type titanosilicate membrane and the Al-CHA-type zeolite membrane in the case where water vapor is contained in a mixed gas ($CO_2/CH_4$ ratio=50/50).

The measurement was performed by setting the inter-membrane differential pressure to 0.1 MPa, the temperature to 40° C., and the water vapor concentration on a volume basis to 0%, 0.1%, 0.2%, 1.0%, 2.0%, and 5.0% (a total of 6 cases) as the test conditions.

In the graph of FIG. 11, the vertical axis on the left side represents the $CO_2$ permeance ratio (%) when the content of water vapor was changed, and this is a ratio (%) when the $CO_2$ permeance $P_{wet}$ in the case where water vapor is contained in the mixed gas is divided by the $CO_2$ permeance $P_{dry}$ in the case where water vapor is not contained in the mixed gas. Incidentally, the Si/Al ratio of the Al-CHA-type zeolite membrane subjected to this test is 10.

According to the graph of FIG. 11, the $CO_2$ permeance ratio of the CHA-type titanosilicate membrane is dominantly higher than that of the Al-CHA-type zeolite membrane, and is maintained at about 80% even in the case where water vapor is contained at 1% in the mixed gas. On the other hand, the $CO_2$ permeance ratio of the Al-CHA-type zeolite membrane decreases by 50% or more.

In the graph of FIG. 11, the vertical axis on the right side represents the $CO_2/CH_4$ selectivity ratio (%) when the content of water vapor was changed, and this is a ratio (%) when the $CO_2/CH_4$ selectivity $Q_{wet}$ in the case where water vapor is contained in the mixed gas is divided by the $CO_2/CH_4$ selectivity $Q_{dry}$ in the case where water vapor is not contained in the mixed gas. It is found that also the $CO_2/CH_4$ selectivity ratio of the CHA-type titanosilicate membrane is dominantly higher than that of the Al-CHA-type zeolite membrane, and hardly decreases even in the case where water vapor is contained at 1% in the mixed gas. On the other hand, the $CO_2/CH_4$ selectivity ratio of the Al-CHA-type zeolite membrane decreases by about 50% or more.

What is claimed is:

1. A method for producing a titanosilicate separation membrane having a CHA-type titanosilicate crystal structure formed on a porous support, comprising:
    a step of producing a seed crystal by performing hydrothermal synthesis in a first synthetic gel obtained by mixing a first raw material containing a silicon source, a titanium source, a fluoride, N,N,N-trialkyl-1-adamantaneammonium cations, and water;
    a step of carrying the seed crystal on the porous support; and
    a step of applying a second synthetic gel obtained by mixing a second raw material containing a silicon source, a titanium source, a fluoride, N,N,N-trialkyl-1-adamantaneammonium cations, and water to the porous support having the seed crystal carried thereon, and performing hydrothermal synthesis.

2. A gas separation method for separating a gas of a specific component from a mixed gas by using the titanosilicate separation membrane having a CHA-type titanosilicate crystal structure produced according to claim 1 formed on a porous support, and bringing the mixed gas into contact with the titanosilicate separation membrane, wherein the mixed gas contains one type or two or more types of first gases having a molecular diameter not smaller than the pore diameter of the CHA-type titanosilicate crystal and one type or two or more types of second gases having a molecular diameter smaller than the pore diameter of the CHA-type titanosilicate crystal, and one type or two or more types of gases selected from the second gases are separated by allowing the gasses to permeate through the titanosilicate separation membrane and the porous support.

3. The gas separation method according to claim 2, wherein the first gas is one or more types of gasses selected from the group consisting of methane, ethane, acetic acid, ethanol, 2-propanol, sulfur hexafluoride, benzene, o-xylene, m-xylene, p-xylene, and toluene, and the second gas is one or more types of gasses selected from the group consisting of hydrogen, helium, water, methanol, carbon dioxide, argon, oxygen, and nitrogen.

\* \* \* \* \*